(12) United States Patent
Georgeson et al.

(10) Patent No.: US 12,054,237 B2
(45) Date of Patent: Aug. 6, 2024

(54) SKINNED CELL STRUCTURES AND METHODS OF PRODUCING THE SAME

(71) Applicant: The Boeing Company, Chicago, IL (US)

(72) Inventors: Gary E. Georgeson, Tacoma, WA (US); Xiaoxi Wang, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 554 days.

(21) Appl. No.: 16/811,729

(22) Filed: Mar. 6, 2020

(65) Prior Publication Data

US 2021/0276687 A1 Sep. 9, 2021

(51) Int. Cl.
*B64C 1/12* (2006.01)
*B29C 44/10* (2006.01)
(Continued)

(52) U.S. Cl.
CPC ............... *B64C 1/12* (2013.01); *B29C 44/10* (2013.01); *B29C 44/5681* (2013.01); *B29C 48/001* (2019.02); *B29C 48/022* (2019.02); *B29C 48/025* (2019.02); *B32B 5/06* (2013.01); *B32B 5/18* (2013.01); *B29C 44/348* (2013.01); *B29C 48/0012* (2019.02); *B29C 2793/0027* (2013.01); *B29K 2105/04* (2013.01); *B29K 2105/048* (2013.01); *B32B 2605/18* (2013.01)

(58) Field of Classification Search
CPC ... B29C 44/10; B29C 44/5681; B29C 48/001; B29C 48/022; B29C 48/02; B29C 44/348; B29C 48/0012; B29C 2793/0027; B29C 69/00; B29C 44/08; B29C 44/353; B64C 1/12; B64C 3/20; B64C 3/26; B64C 2001/0072; B32B 5/06; B32B 5/18; B32B 2605/18; B32B 2262/106; B32B 2266/0214; B32B 3/04; B32B 3/08; B32B 3/12; B32B 5/245; B32B 7/12; B32B 25/045; B29K 2105/04; B29K 2105/048; Y02T 50/40; B29L 2031/3076
See application file for complete search history.

(56) References Cited

U.S. PATENT DOCUMENTS 6,188,840 B1 * 2/2001 Orlowski ........... B29C 45/14598
220/501
2011/0111183 A1 * 5/2011 Guzman ............ B29D 99/0003
428/188

(Continued)

OTHER PUBLICATIONS

Gallagher (Polyurethane's Temperature Range), https://gallaghercorp.com/polyurethane-temperature-range/#:~:text=In%20general%2C%20polyurethane's%20dynamic%20performance,C%20(200%C2%B0F), accessed Mar. 1, 2023 (Year: 2020).*

*Primary Examiner* — S. Behrooz Ghorishi
(74) *Attorney, Agent, or Firm* — Hanley, Flight & Zimmerman, LLC

(57) ABSTRACT

Skinned cell structures and methods of producing the same are disclosed. A disclosed example apparatus includes a placer to place foamable structures together to define a bundle, a restrainer to restrain the bundle, an activator to activate the foamable structures to expand and form a cell structure within the restrainer, a trimmer to trim the cell structure to define a core, and an assembler to couple a skin to the core to define the skinned cell structure.

31 Claims, 6 Drawing Sheets

(51) Int. Cl.
*B29C 44/34* (2006.01)
*B29C 44/56* (2006.01)
*B29C 48/00* (2019.01)
*B29C 48/025* (2019.01)
*B29K 105/04* (2006.01)
*B32B 5/06* (2006.01)
*B32B 5/18* (2006.01)

(56) References Cited

U.S. PATENT DOCUMENTS

| | | | |
|---|---|---|---|
| 2014/0318705 A1* | 10/2014 | McCarville | B29D 99/001 |
| | | | 156/307.1 |
| 2014/0360659 A1* | 12/2014 | Kendrick | B29C 66/0042 |
| | | | 156/60 |
| 2019/0283344 A1* | 9/2019 | Brion | B29C 43/3642 |
| 2020/0039156 A1 | 2/2020 | Wang et al. | |
| 2020/0207033 A1 | 7/2020 | Wang et al. | |
| 2021/0001519 A1 | 1/2021 | Wang et al. | |
| 2021/0001571 A1 | 1/2021 | Santiago et al. | |
| 2022/0055265 A1* | 2/2022 | Gutmann | C08J 9/0061 |

* cited by examiner

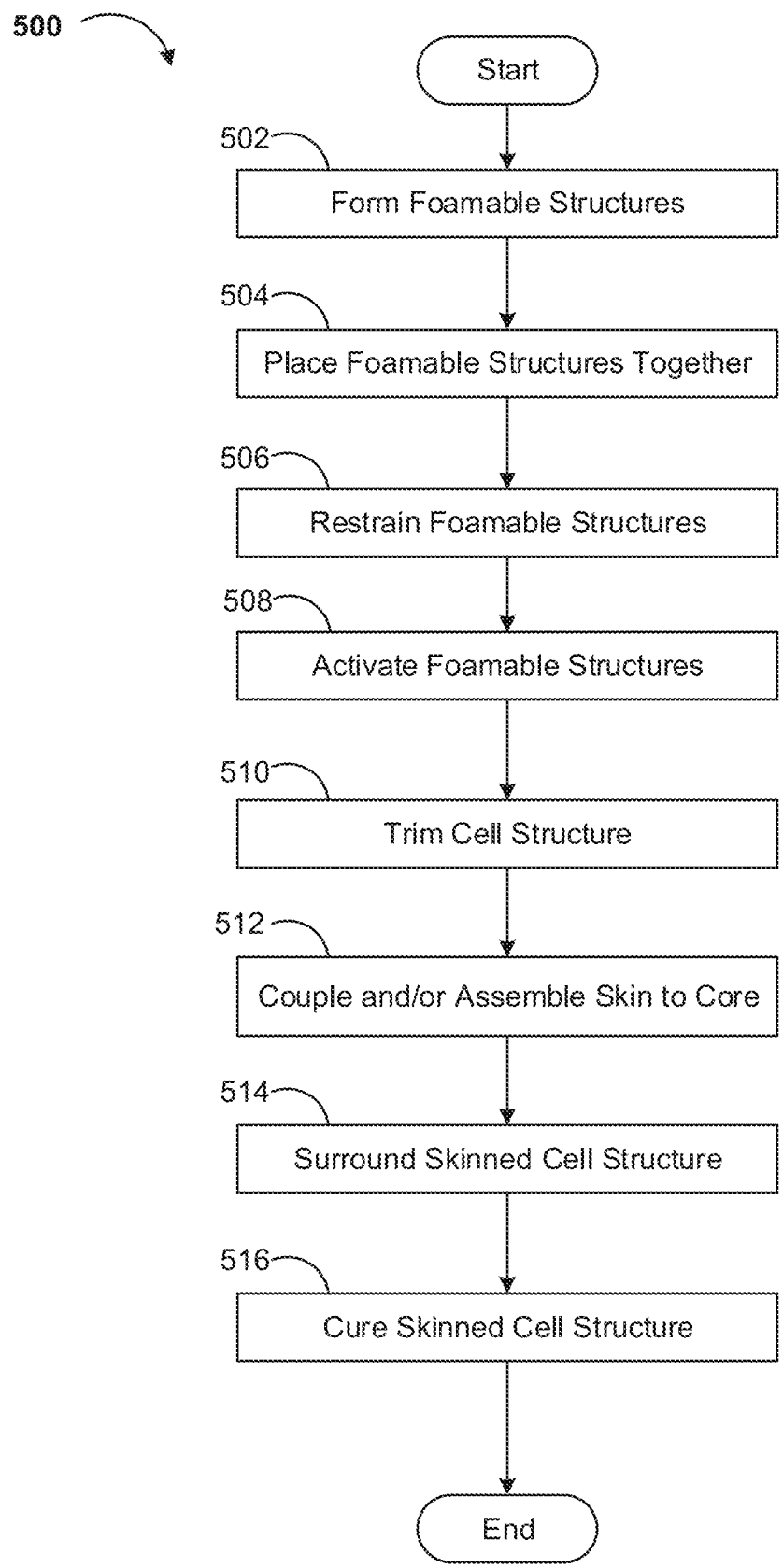

SKINNED CELL STRUCTURES AND METHODS OF PRODUCING THE SAME

FIELD OF THE DISCLOSURE

This disclosure relates generally to layered composites and, more particularly, to skinned cell structures and methods of producing the same.

BACKGROUND

In recent years, layered composites (e.g., layered composite structures) have become more ubiquitous due to their favorable stiffness-to-weight ratios in combination with relatively low production costs. The layered composites typically include at least two different material layers coupled together and are commonly implemented for use on aircraft components, such as rudders, ailerons, spoilers, and flaps.

SUMMARY

An example apparatus includes a placer to place foamable structures together to define a bundle, and a restrainer to restrain the bundle. The example apparatus also includes an activator to apply an activation agent to the foamable structures to form a cell structure within the restrainer. The example apparatus further includes a trimmer to trim the cell structure to define a core, and an assembler to couple the core to a skin.

An example method of producing a skinned cell structure includes placing foamable structures together to define a bundle and restraining the bundle. The example method further includes applying an activation agent to the foamable structures of the bundle to define a cell structure. The example method further includes trimming the cell structure to define a core, and assembling the core to a skin to define the skinned cell structure.

An example skinned cell structure includes a core with cells defined by foamable structures that have been bundled, restrained, and activated via an activation agent. The example skinned cell structure further includes a skin coupled to at least one surface of the core.

BRIEF DESCRIPTION OF THE DRAWINGS

FIG. 5 is a flowchart representative of an example method to produce examples disclosed herein.

Figure 1:
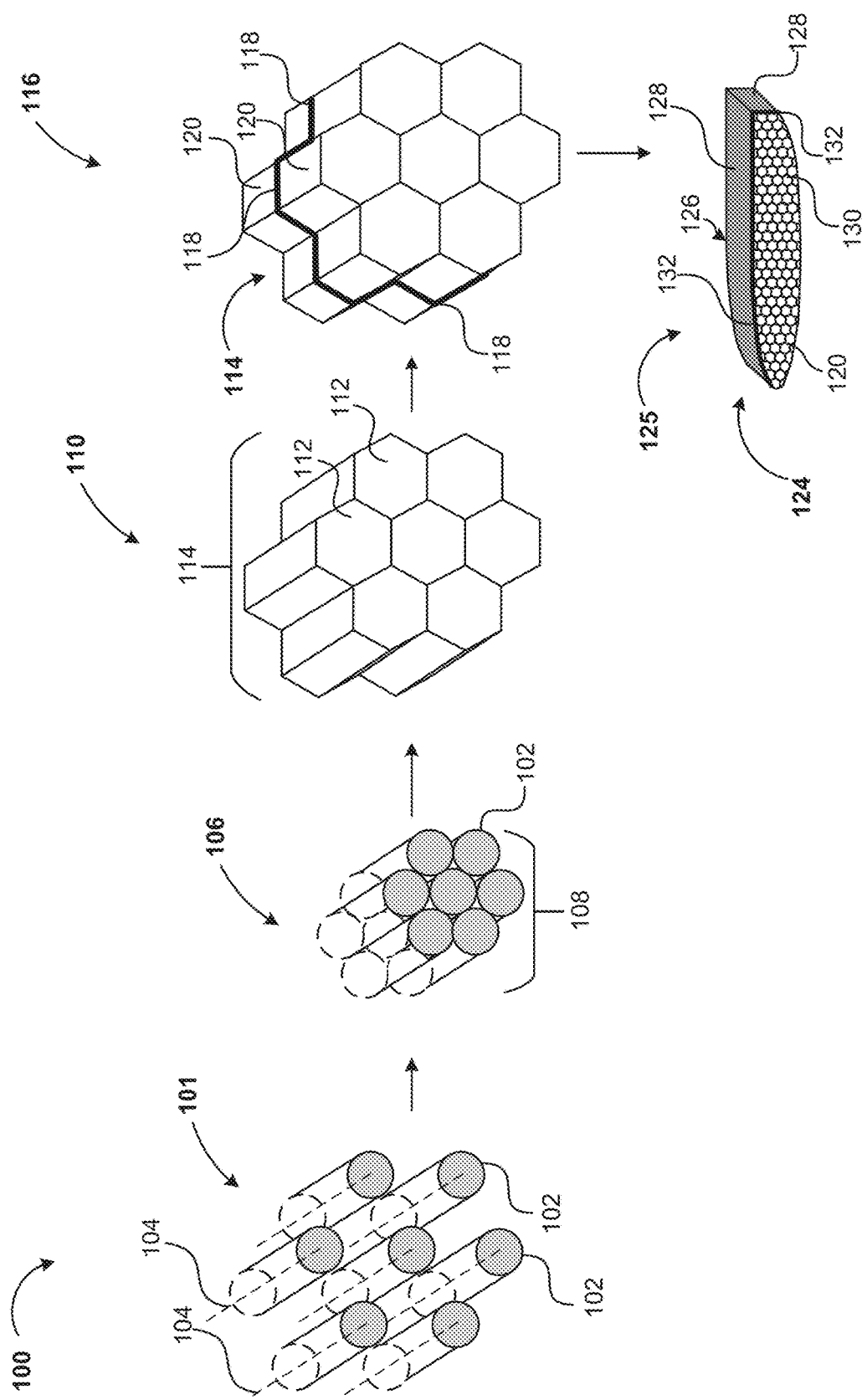
FIG. 1 illustrates an example process to produce skinned cell structures in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Skinned cell structures and methods of producing the same are disclosed. In known implementations, layered composites (e.g., layered composite structures) are typically implemented on aircraft due to their favorable strength characteristics. In particular, the layered composites can be relatively lightweight, but nonetheless exhibit a relatively high amount of structural strength. However, these known implementations can be costly to manufacture and repair.

Examples disclosed herein enable cost-effective, high strength, and lightweight skinned cell structures. Examples disclosed herein can also be rapidly produced for implementation in manufacturing environments and/or field repairs (e.g., replacement of parts and/or sections for existing aircraft). Further, examples disclosed herein can enable manufacturing of components with relatively complex shapes and/or geometries. Additionally or alternatively, examples disclosed herein can be used for thermal and acoustic insulation.

Examples disclosed herein include a cell structure core that is at least partially covered (e.g., fully covered) with a skin (e.g., a protective outer skin, an external skin surface, a carbon fiber skin, etc.). The cell structure is formed by activating foamable structures (e.g., pellets, rods, etc.) with an activation agent provided by an activator (e.g., a thermal activation agent, a chemical activation agent, an application of current, an electrical agent, etc.). Particularly, the foamable structures are placed together (e.g., bundled together) by a placer and restrained (e.g., restrained with a force, encapsulated, elastically restrained, rigidly restrained, etc.) by a restrainer for activation. During activation, the foamable structures expand to define the cell structure. Once formed, the cell structure is trimmed and/or cut (e.g., machine cut, cut into layers, etc.) to define a core, which can be a prismatic block, a layered block, a contoured block, a core piece, a trimmed layer, etc. Further, the core is coupled and/or bonded to the aforementioned skin to define the skinned cell structure.

In some examples, the core includes a fiber-reinforced foam honeycomb material. Additionally or alternatively, the skin includes a pre-preg or a pre-cured component. In some examples, the foamable structures (e.g., pellets, rods, etc.) are formed by an extruder or pultruder. Additionally or alternatively, the foamable structures can be at least partially composed of a fiber reinforcement material. In some examples, the restrainer includes a bladder to elastically restrain bundled foamable structures during expansion thereof caused by an activation process. In some examples, the skin and the core are cured together in an oven and/or an autoclave.

As used herein, the term "foamable structures" refers to discrete material portions (e.g., pellets, rods, granules, solid structures, etc.) that are brought together (e.g., stacked together, bundled together) and activated to define relatively contiguous cells of a cell structure. As used herein, the term "bundle" refers to the aforementioned material portions being placed in proximity and/or contact with one another (e.g., a stack, a bundle, a collection, etc.) prior to activation. As used herein, the term "cell structure" refers to a structure at least partially resembling a cellular pattern (e.g., a honeycomb pattern, a closed cell pattern, etc.) that is formed from activation of at least one foamable structure. As used herein, the term "core" refers to the aforementioned cell structure that is to be coupled to a skin. Accordingly, the cell structure can be shaped, trimmed, and/or cut to define the core for coupling to the skin. As used herein, the term "skin" refers to a surface, wall, and/or contour that is adhered to the core and/or cell structure to at least partially define an exterior (e.g., an exterior surface, an exterior wall, etc.) thereof. As used herein, the term "bladder" refers to a structure, assembly, membrane and/or component that is expandable.

FIG. 1 illustrates an example process 100 to produce skinned cell structures in accordance with teachings of this disclosure. In the illustrated example, at an example forming step 101, foamable structures 102 are shown after a forming process (e.g., an extrusion process, a pultrusion process, etc.). In this particular example, the foamable structures 102 have been extruded with a generally circular cross-sectional shape profile along respective longitudinal axes 104. However, in other examples, the foamable structures 102 may be extruded to have any other appropriate cross-sectional shape profile including, but not limited to, a rectangularly shaped profile, a triangularly shaped profile, a polygonal shaped profile, etc. Additionally or alternatively, the foamable structures 102 are formed as pellets and/or grains. In some examples, an amount, a size, a density, and/or a shape of the foamable structures 102 is varied based on the desired characteristics of a resultant cell structure. In some examples, the foamable material includes and/or is at least partially composed of thermoplastic resins.

At an example restraining step 106, the foamable structures 102 are placed in contact with one another (e.g., bundled, stacked, arranged, patterned, etc.), thereby defining a bundle 108. The foamable structures 102 can be arranged in an interwoven or staggered arrangement, for example. In some examples, the foamable structures 102 are stacked and/or arranged in a grid and/or lattice pattern. In this example, the foamable structures 102 are placed into contact with one another. However, in other examples, the bundle 108 includes a combination of foamable structures 102 and structural rods (e.g., metal rods, thermoplastic rods, hollow rods, thermoset rods, hollow glass beads, etc.). In some examples, the structural rods are generally solid (e.g., not containing internal voids or openings) with the foamable structures 102 placed in between the structural rods. Additionally or alternatively, the foamable structures 102 can be placed inside internal openings (e.g., hollow openings) of structural rods for subsequent activation. In some examples, hollow structural rods act as restrainers. Additionally or alternatively, a skin is placed into contact with the metal rods and provided with thermal energy and/or current/electricity from the metal rods (e.g., to cure the skin to activated foamable structures).

At an example activating step 110, the foamable structures 102 are activated (e.g., thermally, electrically, and/or chemically activated) by an activation agent provided by an activator 208 (shown in FIG. 2) to define individual cells (e.g., activated foamable structures) 112 and, thus, a cell structure (e.g., a celled grid, a honeycomb pattern, a cellular pattern, etc.) 114. In this example, the foamable structures 102 expand, bond, and/or adhere to one another during activation thereof. While the cells 112 are generally depicted as approximated hexagonal shapes in this example, the cells 112 can be any appropriate cell shape and/or pattern based on a relative arrangement of the foamable structures 102 in the bundle 108 and/or different activation process parameters.

An example trimming step 116 corresponds to the cell structure 114 being trimmed and/or cut (e.g., machine cut, sliced, laser cut, etc.) about a cut line 118 to define at least one distinct core (e.g., a core piece, a core layer, a trimmed core, etc.) 120. In this example, the cores 120 are generally depicted as layers. However, in other examples, the cores 120 can be trimmed and/or cut into any other appropriate shape. For example, the cell structure 114 can be cut (e.g., machined, etched, waterjet cut, etc.) along multiple directions (e.g., 3-D cut) to form the relatively complex geometries (e.g. curved surfaces, openings, contours, etc.) of the cores 120. In some other examples, a core is defined by an activation process (e.g., the core is not cut and/or trimmed).

At an example assembly step 125, the core 120 is shown coupled, adhered, assembled, and/or bonded to a skin (e.g., a carbon fiber skin, an elastomer skin, etc.) 126 to define a skinned cell structure 124. In this example, the skin 126 has corresponding surfaces 128 that at least partially cover the core 120. In the illustrated example, the skin 126 does not cover at least one portion or side 130 of the core 120. However, in some other examples, the skin 126 generally surrounds (e.g., envelopes) all sides and/or surfaces of the core 120. In this example, once the core 120 is coupled to the skin 126, the core 120 and the skin 126 are cured with a heating process. In some examples, a bond layer (e.g., an adhesive layer, an applied adhesive layer, an epoxy layer, etc.) 132 couples the core 120 to the skin 126.

Figure 2:
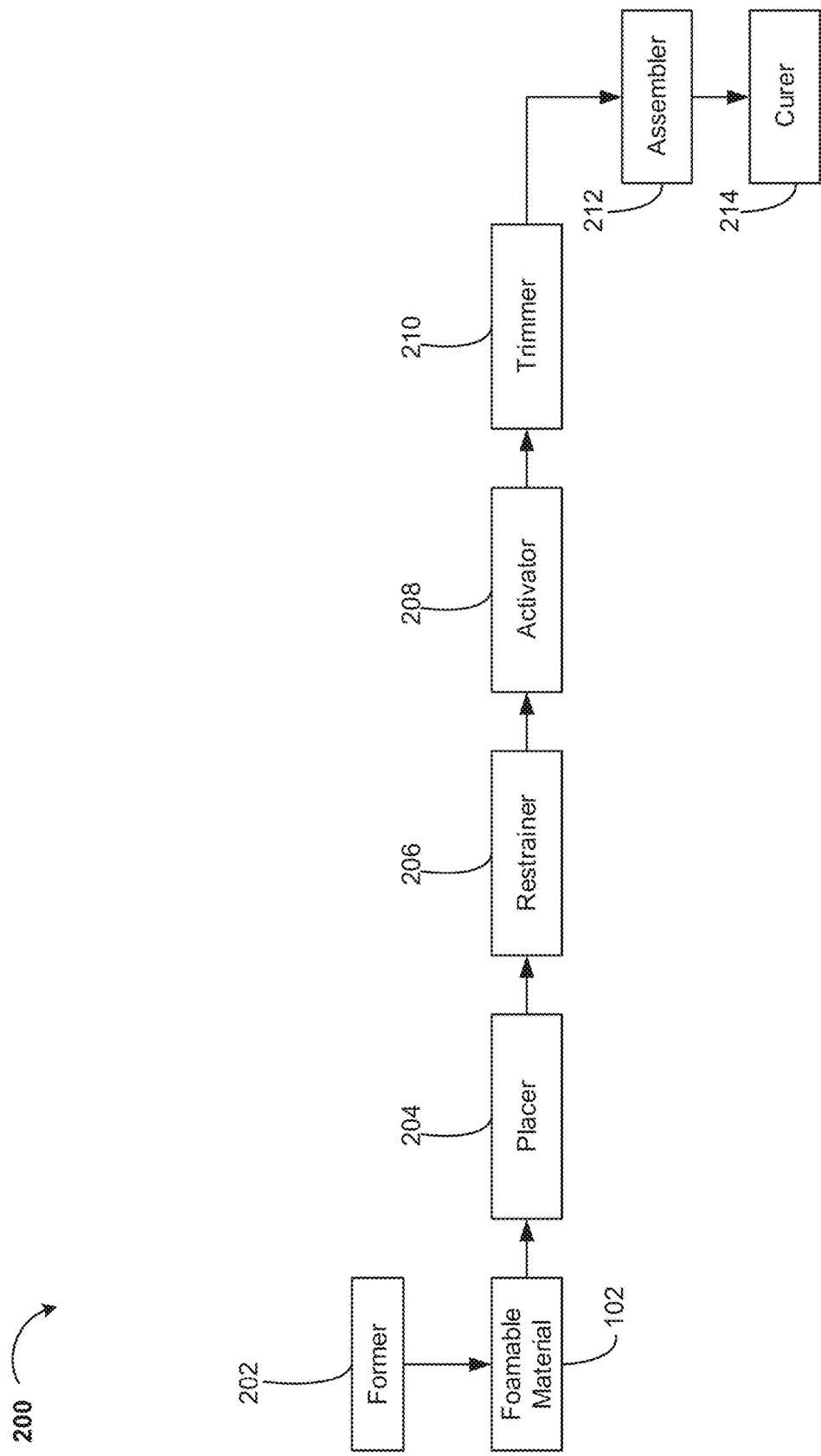
FIG. 2 is a schematic representation of an example skinned cell structure production system to produce examples disclosed herein.

FIG. 2 is a schematic representation of an example skinned cell structure production system 200 to produce examples disclosed herein. The skinned cell structure production system 200 of the illustrated example includes a former 202, a placer 204, a restrainer 206, the aforementioned activator 208, a trimmer 210, an assembler 212, and a curer 214. In some examples, the former 202, the placer 204, the restrainer 206, the activator 208, the trimmer 210, the assembler 212, and/or the curer 214 are part of a single process and/or apparatus.

To form and/or produce the foamable structures 102, the example former 202 applies a forming process (e.g., an extrusion process, a pultrusion process, etc.) to foamable media (e.g., a slurry, a dry media, etc.), thereby producing structures (e.g., pellets, rods, tubes, etc.) for subsequent activation (e.g., foam activation). In some other examples, the former 202 is implemented as a pelletizer system. In some such examples, pelletized media and/or structures can be bonded together during a bonding process to define the foamable structures 102.

To define the bundle 108 shown in FIG. 1, the placer 204 defines an array (e.g., a lattice) of foamable structures 102 by placing and/or positioning the foamable structures 102 together. In some examples, the placer 204 stacks the foamable structures 102 so that the foamable structures 102 contact one another (e.g., as a lattice pattern or an interwoven arrangement) to more effectively form a closed cell structure once the foamable structures 102 are activated. In some examples, a stiffener, such as a laminate composite layer, for example, is placed within the bundle 108. In some such examples, the stiffener can provide structural support to a resultant cell structure.

To restrain the foamable structures 102 prior to activation, the example restrainer 206 is positioned to wrap and/or partially surround the foamable structures 102 and/or the bundle 108. In particular, the restrainer 206 expands elastically along with the foamable structures 102 during activation. Alternatively, the restrainer 206 can be implemented to rigidly restrain the foamable structures 102.

To form the cell structure 114, the activator 208 applies an activation agent to the foamable structures 102 as the foamable structures are held and/or restrained by the restrainer 206. The activation agent causes the foamable structures 102 of the bundle 108 to expand and bond (e.g., to coalesce, to sinter, etc.), thereby forming the cell structure 114. In some examples, the activation agent includes thermal energy generated and provided by an oven or any other appropriate thermal energy source. Additionally or alternatively, the activation agent includes a chemical compound and/or chemical agent that activates the foamable structures 102. In some other examples, the activation agent includes a current or voltage source (e.g., a generator, electricity, a voltage source, etc.), for example. In some examples, the current or voltage source generates thermal energy (e.g., via electrical resistance) to activate the foamable structures 102. Additionally or alternatively, in some examples, the curer 214 at least partially activates the foamable structures 102.

In the illustrated example, to define at least one of the cores 120, the trimmer 210 cuts and/or divides (e.g., subdivides) the cell structure 114 (e.g., the cell structure 114 is subdivided into multiple ones of the cores 120). In some examples, the cell structure 114 is cut and/or trimmed into a single one of the cores 120 that, in turn, is coupled to the skin 126. In some other examples, the cell structure 114 is not cut and/or trimmed.

To couple the skin 126 to the core 120, the assembler 212 of the illustrated example is implemented to place the skin 126 and the core 120 into contact with one another and apply and/or define the bond layer 132 therebetween. In some examples, the assembler 212 places the core 120 and the skin 126 in a vacuum bag after they have been adhesively bonded (e.g., via a structural adhesive) to one another. In this example, coupling the skin 126 to the core 120 via the bond layer 132 defines the skinned cell structure 124.

In some examples, the curer 214 solidifies the bond layer 132 between the skin 126 and the core 120 to define the skinned cell structure 124. The curer 214 can be implemented as an oven or autoclave. In some such examples, the skin 126 can be at least partially cured onto at least one side of the core 120.

Figure 3:
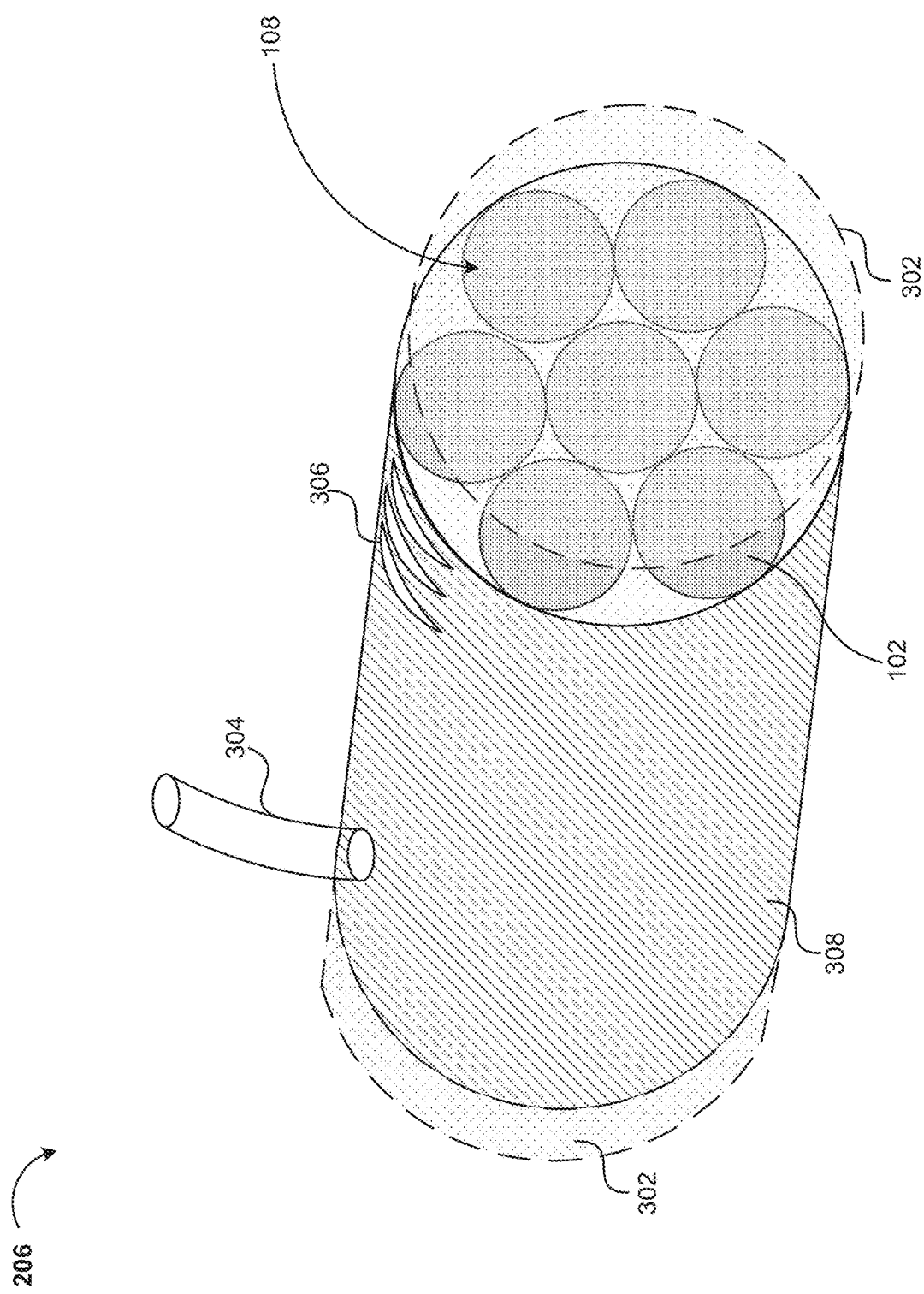
FIG. 3 illustrates an example restrainer that can be implemented in examples disclosed herein.

FIG. 3 illustrates the example restrainer 206 that can be implemented in examples disclosed herein to constrain and/or restrain the bundle 108 during activation of the foamable structures 102. In the illustrated example, the restrainer 206 includes end stops 302 on both lateral sides of the restrainer 206, a fluid path (e.g., a tube, a pipe, a container, a path, etc.) 304, an opening (e.g., a vent, a slit, etc.) 306, and a bladder (e.g., an elastic bladder, etc.) 308. In the illustrated view of FIG. 3, the bundle 108 is shown disposed within the example restrainer 206.

The example bladder 308 is implemented to constrain (e.g., elastically constrain) and hold the foamable structures 102 together as they expand during activation. In this example, the bladder 308 expands along with the foamable structures 102 during activation but provides a restraining force to the foamable structures 102. In particular, the example bladder 308 constrains the foamable structures 102 to generally maintain a relative arrangement of the bundle 108 and ensure that the foamable structures 102 are held with sufficient compression so that they expand into a relatively ordered cellular pattern. In some examples, a relatively small constraining force provided by the bladder 308 facilitates adherence of the foamable structures 102 during and after the activation process. In other examples, the bladder 308 has a varying elasticity in different locations resulting in differing localized expansion of the foamable structures 102 and, thus, varying densities across a resultant cell structure. In other examples, a rigid container is implemented instead of the bladder 308.

In some examples, the fluid path 304 provides the aforementioned activation agent to the restrainer 206 and, in turn, the foamable structures 102. In the illustrated example, the fluid path 304 is implemented as a tube (e.g., an elastic tube, a rigid tube, a conduct, etc.) that is fluidly coupled and sealed to the restrainer 206. For some such examples, the opening 306 can be implemented to allow gas byproducts from the activation process to exit the restrainer 206. In some other examples, the fluid path 304 is not implemented. In some such examples, the activation agent travels from the activator 208 and through the bladder 308 and, thus, to the foamable structures 102 (e.g., the bladder 308 is at least semipermeable).

In some examples, the end stops 302 are implemented to reduce (e.g., prevent) expansion of the foamable structures 102 along a longitudinal direction of the restrainer 206. In particular, the example end stops 302, which can be rigid or elastic, contact (e.g., border, cover, etc.) and restrain at least one longitudinal end of the bundle 108. In other examples, only one of the end caps 302 is implemented. Additionally or alternatively, the end stop 302 laterally constrains the foamable structures 102 (e.g., constrains at least lateral portions of the foamable structures 102).

In some examples, more than one restrainer 206 is stacked (e.g., adjacently stacked, vertically stacked, concentrically stacked, etc.) to vary a size of the cell(s) 112 and, thus, a density of the cell structure 114 in various areas (e.g., density variations, localized variations and/or gradients are defined). For some such examples, the density of the resultant core 120 can be increased at locations such as edges, attachment points, build-ups, coupling areas/points, etc.

Additionally or alternatively, the restrainer(s) 206 at least partially defines the desired shape of the core 120 and, subsequently, the cell structure 114 is coupled to the skin 126 after activation of the foamable structures 102. In some other examples, the restrainer 206 defines and/or forms the skin 126. In such examples, the restrainer 206 remains at least partially coupled to the cell structure 114 after activation of the foamable structures 102 and, thus, is the skin 126 after the activation process. In some examples, the restrainer 206 includes a thermoplastic material that can be burned off and/or disintegrated during or after the activation process.

Figure 4A:
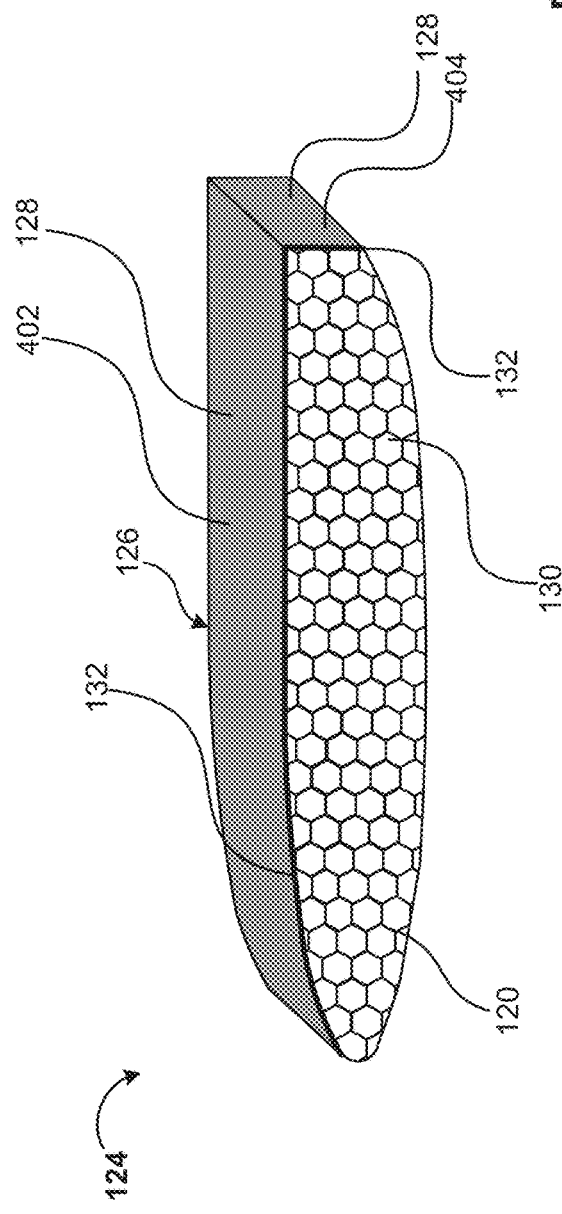
FIGS. 4A-4D illustrate example skinned cell structures in accordance with teachings of this disclosure.

FIGS. 4A-4D illustrate example skinned cell structures in accordance with teachings of this disclosure. Turning to FIG. 4A, the example skinned cell structure 124 is shown with a core 120 having a relatively uniform density. In the illustrated example, the skinned cell structure 124 includes the aforementioned core 120 coupled to the skin 126 via the bond layer (e.g., an adhesive bond layer) 132, which may be implemented as a chemical fastener and/or adhesive. In other words, the bond layer 132 is disposed between the skin 126 and the core 120. In other examples, a mechanical fastener(s) (e.g., a screw, a rivet, etc.) is implemented instead.

In the illustrated example, at least one of the surfaces 128 exhibits curvature while other ones of the surfaces 128 are relatively flat. In particular, the skin 126 is continuous and a first portion 402 of the skin 126 is placed onto curved portions and/or surfaces of the core 120 while a second portion 404 of the skin 126 is placed onto a relatively flat surface of the core 120. Additionally or alternatively, the first and second portions 402, 404 of the skin 126 are distinct and coupled separately during separate coupling steps or a single coupling step. In some examples, the at least a portion of the skin 126 and/or the core 120 is cut to expose at least one inner surface of the core 120.

In this example, the core 120 includes the exposed side 130, which can be placed adjacent to an exposed non-exterior surface of another component (e.g., during a field repair). In some examples, multiple ones of the skinned cell structures 124 are coupled at their respective exposed surfaces 130 to form a single part. In some other examples, the core 120 is fully surrounded (e.g., fully enveloped, fully enclosed, etc.) by the skin 126.

Figure 4B:
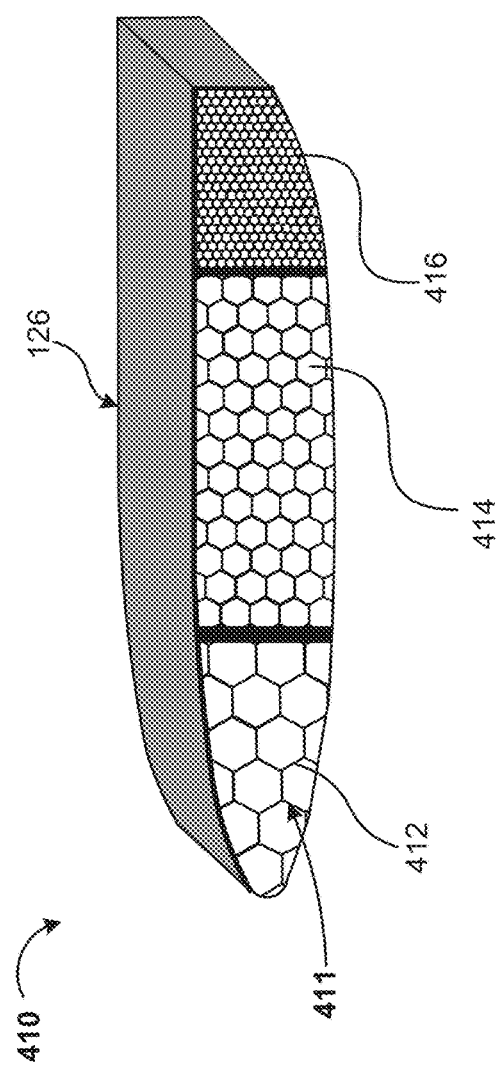

FIG. 4B illustrates an example skinned cell structure 410 with a composite core 411 that has varying density cores 412, 414, 416 in different regions. In the illustrated example, the varying density of the core 411 enables the skinned cell structure 410 to exhibit different strength and flexibility based on load conditions (e.g., a location of an applied load). In some examples, the cores (e.g., core regions) 412, 414, 416 are formed during a single activation process (e.g., using stacked ones of the restrainers 206 and/or varying elasticities along different sections of the bladder 308). In other examples, the cores 412, 414, 416 are formed during separate activation processes and stacked and/or coupled together to define the core 411.

Figure 4C:
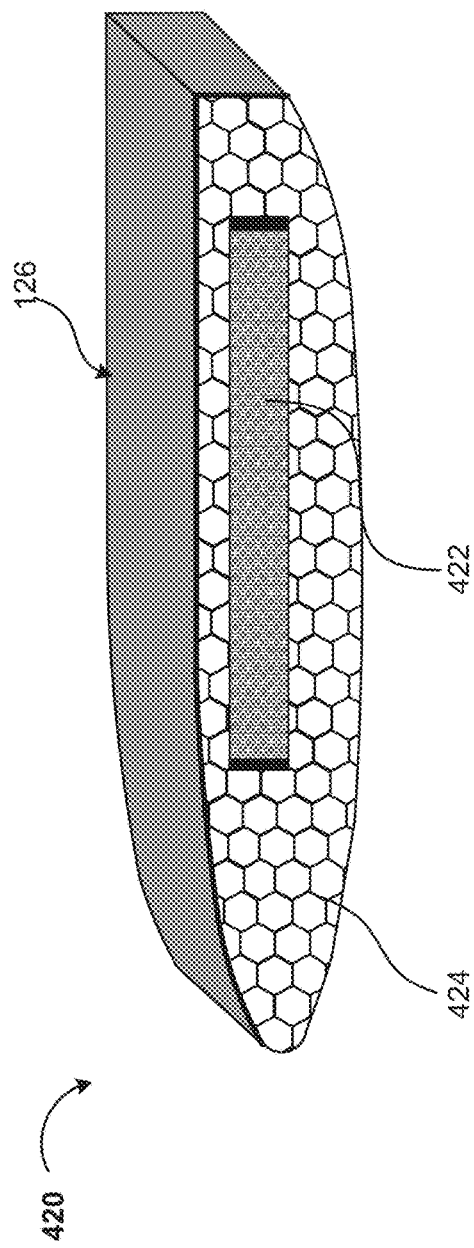

FIG. 4C illustrates an example skinned cell structure 420 with a stiffener 422 implemented in a core 424. In some examples, the stiffener 422 includes a laminate composite and/or metal structure that provides structural support to the skinned cell structure 420. In some examples, the stiffener 422 is placed within and/or surrounded by the foamable structures 102 prior to the activation process, thereby resulting in the core 424 adhering to the stiffener 422. In other examples, the stiffener 422 is inserted into an opening of the core 424 and coupled (e.g., bonded, adhered, etc.) to the core 424.

Figure 4D:
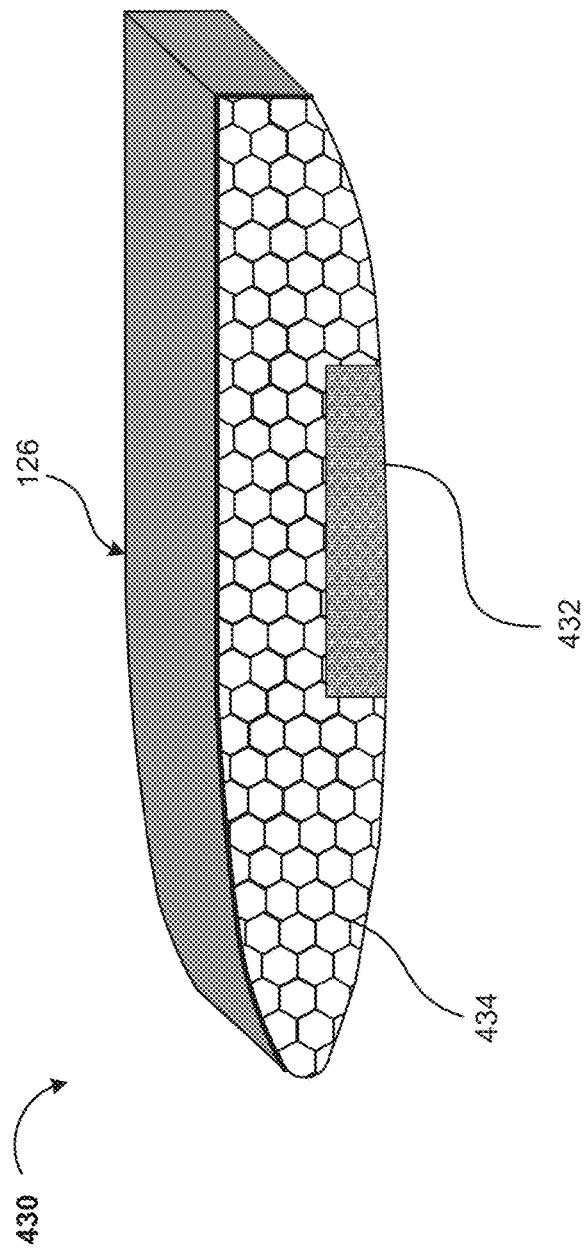

FIG. 4D illustrates an example skinned cell structure 430 with a stiffener 432 applied to a core 434. In this example, the stiffener 432 is bonded to an external surface(s) of the core 434 and/or the skin 126 (e.g., an internal surface of the skin 126). In some examples, the stiffener 432 is coupled to and/or placed onto the skin 126.

FIG. 5 is a flowchart representative of an example method 500 to implement examples disclosed herein. The example method 500 is implemented by the skinned cell structure production system 200 to produce a skinned cell structure (e.g., the skinned cell structure 124). In this particular example, the skinned cell structure is to be assembled to a surface of an aerodynamic body of an aircraft (e.g., as a section of a wing of the aircraft).

At block 502, foamable structures (e.g., the foamable structures 102) are formed by a former (e.g., the former 202). In some examples, the foamable structures are formed with a fiber reinforcement. In some such examples, the fiber reinforcement can be pulled through an extruder. Additionally or alternatively, the fiber reinforcement can be located proximate or at outer surfaces of the foamable structure. In some examples, the foamable structure is extruded as tube-shaped by the extruder.

At block 504, the foamable structures are placed together (e.g., arranged together as a patterned array). For example, the foamable structures are arranged in an interspersed grid array so that a hexagonal-like cell shapes are defined subsequent to an activation process. In some examples, a stiffener (e.g., stiffener 422, 432) is placed between or touching the foamable structures (e.g., at outer surfaces of the foamable structures).

At block 506, the foamable structures are constrained and/or restrained via a restrainer (e.g., the restrainer 206). In this example, the foamable structures are held together as a patterned array. In some examples, the restrainer includes end stops (e.g., the end stops 302) that may be movable (e.g., translationally movable, etc.).

At block 508, the foamable structures are activated, via an activation agent from an activator (e.g., activator 208), to define a cell structure (e.g., the cell structure 114). In this example, the foamable structures expand as a result of a sintering activation process. In some examples, the cell structure includes a stiffener (e.g., the stiffener 422) disposed within.

At block 510, the cell structure is trimmed, via a trimmer (e.g., trimmer 210), to define a core (e.g., the core 120). In some examples, the cell structure is trimmed into multiple core layers. In some other examples, the cell structure is cut and/or trimmed to define a single core (e.g., a shaped core, a machined core, etc.). In yet other examples, the cell structure is not trimmed and, thus, defines a core.

At block 512, a skin (e.g., the skin 126) is coupled and/or assembled to the core, via an assembler (e.g., the assembler 212), to define the skinned cell structure (e.g., the skinned cell structure 124). In some examples, the assembler adhesively bonds the core and the skin together. In other examples, the restrainer remains attached to the core and, thus, functions as the skin. Additionally or alternatively, the stiffener can be assembled to or within the core.

At block 514, the skinned cell structure is then placed into and/or surrounded by an enclosure. In some examples, the enclosure includes a vacuum bag to ensure that the bond between the core and skin remains intact.

At block 516, in some examples, the cell structure is cured (e.g., by the curer 214). In this example, an oven is utilized to provide heat to the skinned cell structure, thereby curing a bond layer between the skin and the core. In some examples, an autoclave is implemented to solidify the bond layer between the core and the skin.

Example methods, apparatus, systems, and articles of manufacture to produce skinned cell structures are disclosed herein. Further examples and combinations thereof include the following:

Example 1 includes an apparatus to produce a skinned cell structure, the apparatus including a placer to place foamable structures together to define a bundle, a restrainer to restrain the bundle, an activator to apply an activation agent to the foamable structures to form a cell structure within the restrainer, a trimmer to trim the cell structure to define a core, and an assembler to couple a skin to the core to define the skinned cell structure.

Example 2 includes the apparatus of example 1, further including a former to extrude or pultrude the foamable structures.

Example 3 includes the apparatus of example 1, wherein the foamable structures include a fiber reinforcement material.

Example 4 includes the apparatus of example 3, wherein the fiber reinforcement material is located proximate outer surfaces of the foamable structures.

Example 5 includes the apparatus of example 1, wherein the restrainer includes an end stop at a longitudinal end of the bundle.

Example 6 includes the apparatus of example 1, wherein the restrainer includes an elastic bladder to laterally surround the bundle.

Example 7 includes the apparatus of example 6, wherein the bladder includes different elasticities at different portions thereof.

Example 8 includes the apparatus of example 1, wherein the activation agent includes at least one of thermal energy, current, or a chemical agent.

Example 9 includes the apparatus of example 1, further including a curer to cure the skinned cell structure.

Example 10 includes a method of producing a skinned cell structure, the method including placing foamable structures together to define a bundle, restraining the bundle, applying an activation agent to the foamable structures of the bundle to define a cell structure, trimming the cell structure to define a core, and assembling the core to a skin to define the skinned cell structure.

Example 11 includes the method of example 10, further including placing a stiffener within the bundle.

Example 12 includes the method of example 10, wherein placing the foamable structures together includes placing the foamable structures in a patterned array.

Example 13 includes the method of example 10, wherein the activation agent includes at least one of thermal energy, current, or a chemical agent.

Example 14 includes the method of example 10, wherein assembling the core to the skin includes defining a bond layer between the core and the skin.

Example 15 includes the method of example 10, wherein trimming the cell structure includes subdividing the cell structure into layers.

Example 16 includes the method of example 11, further including placing the core and the skin in a vacuum bag, and curing, via an oven, the core and the skin.

Example 17 includes a skinned cell structure including a core including cells defined by foamable structures that have been bundled, restrained, and activated via an activation agent, and a skin coupled to at least one surface of the core.

Example 18 includes the skinned cell structure of example 17, wherein the core includes a fiber-reinforcement material.

Example 19 includes the skinned cell structure of example 17, wherein the core includes a stiffener between the cells.

Example 20 includes the skinned cell structure of example 17, wherein the skin includes at least one of a pre-cured composite material or a pre-preg composite material.

From the foregoing, it will be appreciated that example methods, apparatus and articles of manufacture have been disclosed that enable a high-strength, lightweight, and cost-effective skinned cell structure. Examples disclosed herein can be rapidly manufactured and deployed. As a result, examples disclosed herein can be utilized in a relatively short amount of time (e.g., for urgent field repair or manufacturing needs, etc.).

The following claims are hereby incorporated into this Detailed Description by this reference, with each claim standing on its own as a separate embodiment of the present disclosure.

What is claimed is:

1. An apparatus to produce a skinned cell structure, the apparatus comprising:
   a placer to place foamable structures together to define a bundle, the bundle defining a perimeter, the foamable structures having a first volume, wherein first ones of the foamable structures have a first size, and wherein second ones of the foamable structures have a second size different from the first size;
   a restrainer to wrap around the perimeter and restrain the bundle, the first ones of the foamable structures placed on a first portion of the restrainer and the second ones of the foamable structures placed on a second portion of the restrainer;
   an activator to apply an activation agent to the foamable structures to expand within the restrainer and form a cell structure within the restrainer, the cell structure having a second volume that is greater than the first volume, the first portion of the restrainer defining first cells of the cell structure, the second portion of the restrainer defining second cells of the cell structure having a different size from that of the first cells;
   a trimmer to trim the cell structure to define a core; and
   an assembler to couple a skin to the core to define the skinned cell structure.

2. The apparatus of claim 1, further including a former to extrude or pultrude the foamable structures.

3. The apparatus of claim 1, wherein the foamable structures include a fiber reinforcement material.

4. The apparatus of claim 3, wherein the fiber reinforcement material is located proximate outer surfaces of the foamable structures.

5. The apparatus of claim 1, wherein the restrainer includes an end stop at a longitudinal end of the bundle.

6. The apparatus of claim 1, wherein the restrainer includes an elastic bladder to laterally surround the perimeter.

7. The apparatus of claim 6, wherein the elastic bladder includes different elasticities at different portions thereof.

8. The apparatus of claim 1, wherein the activation agent includes at least one of thermal energy, current, or a chemical agent.

9. The apparatus of claim 1, further including a curer to cure the skinned cell structure.

10. The apparatus of claim 9, further including an enclosure to surround the skinned cell structure to maintain contact between the skin and the core during curing.

11. The apparatus of claim 1, wherein the trimmer is to trim the cell structure to define the core prior to the assembler coupling the skin to the core.

12. The apparatus of claim 1, wherein the assembler is to couple the skin to the core via an adhesive bond layer.

13. The apparatus of claim 1, wherein the restrainer includes a thermoplastic material to at least one of burn off or disintegrate during activation of the foamable structures.

14. The apparatus of claim 1, wherein the restrainer is to wrap around an entire circumference of the perimeter.

15. The apparatus of claim 14, wherein the restrainer is to compress the foamable structures as the activation agent expands the foamable structures.

16. The apparatus of claim 1, wherein the restrainer is to elastically expand by contacting the foamable structures as the foamable structures expand within the restrainer.

17. The apparatus of claim 1, wherein the restrainer is to impart a compression force onto the foamable structures prior to the application of the activation agent to the foamable structures.

18. The apparatus of claim 1, wherein the first cells are adjacent the second cells.

19. The apparatus of claim 1, wherein the first cells and the second cells are separated by a distance.

20. The apparatus of claim 1, wherein the restrainer includes an opening, and wherein gas byproducts from activation of the foamable structures are to exit the restrainer via the opening.

21. A method of producing a skinned cell structure, the method comprising:
    placing foamable structures together to define a bundle having a perimeter, the foamable structures having a first volume, wherein first ones of the foamable structures have a first size, and wherein second ones of the foamable structures have a second size different from the first size;
    wrapping a restrainer around the perimeter to restrain the bundle, the first ones of the foamable structures placed on a first portion of the restrainer and the second ones of the foamable structures placed on a second portion of the restrainer;
    applying an activation agent to the foamable structures of the bundle to cause the foamable structures to expand within the restrainer and form a cell structure within the restrainer, the cell structure having a second volume that is greater than the first volume, the first portion of the restrainer defining first cells of the cell structure, the second portion of the restrainer defining second cells of the cell structure having a different size from that of the first cells;
    trimming the cell structure to define a core; and
    assembling the core to a skin to define the skinned cell structure.

22. The method of claim 21, further including placing a stiffener within the bundle.

23. The method of claim 22, further including:
    placing the core and the skin in a vacuum bag; and
    curing, via an oven, the core and the skin.

24. The method of claim 21, wherein placing the foamable structures together includes placing the foamable structures in a patterned array.

25. The method of claim 21, wherein the activation agent includes at least one of thermal energy, current, or a chemical agent.

26. The method of claim 21, wherein assembling the core to the skin includes defining a bond layer between the core and the skin.

27. The method of claim 21, wherein trimming the cell structure includes subdividing the cell structure into layers.

28. A skinned cell structure comprising:
    a core including cells defined by foamable structures that have been bundled, wrapped with a restrainer to be restrained, and activated via an activation agent while being restrained, the foamable structures having a first volume within the restrainer prior to being activated, wherein first ones of the foamable structures have a first size, and wherein second ones of the foamable structures have a second size different from the first size, the first ones of the foamable structures placed on a first portion of the restrainer and the second ones of the foamable structures placed on a second portion of the restrainer, the foamable structures to be applied with the activation agent to expand within the restrainer to form foam with a second volume greater than the first volume, the first portion of the restrainer defining first cells of the foam, the second portion of the restrainer defining second cells of the foam having a size that is different from that of the first cells; and
    a skin coupled to at least one surface of the core.

29. The skinned cell structure of claim 28, wherein the core includes a fiber-reinforcement material.

30. The skinned cell structure of claim 28, wherein the core includes a stiffener between the cells.

31. The skinned cell structure of claim 28, wherein the skin includes at least one of a pre-cured composite material or a pre-preg composite material.

* * * * *